(12) United States Patent
Pineiros et al.

(10) Patent No.: US 7,329,066 B2
(45) Date of Patent: Feb. 12, 2008

(54) SOLID SHANK PAWL PIN WITH REDUNDANT LOCKING SYSTEM

(75) Inventors: Victor M Pineiros, Rancho Santa Margarita, CA (US); Bobby Lamar Waits, Moreno Valley, CA (US); Fernando De La Fuente, Irvine, CA (US)

(73) Assignee: SPS Technologies, LLC, Jenkintown, PA (US)

( * ) Notice: Subject to any disclaimer, the term of this patent is extended or adjusted under 35 U.S.C. 154(b) by 109 days.

(21) Appl. No.: 10/554,963

(22) PCT Filed: May 13, 2004

(86) PCT No.: PCT/US2004/014881

§ 371 (c)(1),
(2), (4) Date: Oct. 31, 2005

(87) PCT Pub. No.: WO2004/104428

PCT Pub. Date: Dec. 2, 2004

(65) Prior Publication Data

US 2006/0280551 A1    Dec. 14, 2006

Related U.S. Application Data

(60) Provisional application No. 60/470,721, filed on May 16, 2003.

(51) Int. Cl.
*F16B 21/00* (2006.01)
(52) U.S. Cl. .............. 403/353; 403/150; 403/154; 403/157; 403/325; 411/349
(58) Field of Classification Search .............. 403/150, 403/151, 154, 157, 325, 353; 411/347, 349, 411/351
See application file for complete search history.

(56) References Cited

U.S. PATENT DOCUMENTS

| | | | | |
|---|---|---|---|---|
| 3,145,441 A | * | 8/1964 | Strandrud | 411/347 |
| 3,243,837 A | * | 4/1966 | Smith | 16/429 |
| 3,386,137 A | * | 6/1968 | McCarthy | 411/347 |
| 3,474,506 A | * | 10/1969 | Metz | 411/347 |
| 3,596,554 A | * | 8/1971 | Low et al. | 411/348 |
| 3,675,499 A | * | 7/1972 | Marosy | 24/573.11 |
| 3,679,244 A | * | 7/1972 | Reddy | 403/109.3 |
| 3,979,994 A | * | 9/1976 | Collignon | 411/351 |
| 4,385,851 A | * | 5/1983 | Bellamy | 403/325 |
| 4,582,347 A | * | 4/1986 | Wilcox et al. | 285/12 |
| 4,696,611 A | * | 9/1987 | Guay | 411/103 |
| 4,768,405 A | * | 9/1988 | Nickipuck | 81/177.85 |
| 4,830,530 A | * | 5/1989 | Meineke | 403/12 |
| 5,002,418 A | * | 3/1991 | McCown et al. | 403/24 |
| 5,104,141 A | * | 4/1992 | Grove et al. | 280/86.753 |
| 5,433,550 A | | 7/1995 | Huber | |
| 5,873,289 A | * | 2/1999 | Jarvis | 81/177.85 |

(Continued)

FOREIGN PATENT DOCUMENTS

GB    2019483 A    * 10/1979

*Primary Examiner*—Daniel P. Stodola
*Assistant Examiner*—Joshua T Kennedy

(57) ABSTRACT

Apparatus comprising and methods relating to a quick disconnect pin having a locking member, a first body segment and a second body segment wherein the first and second body segments are rotatably coupled to each other, and relative rotation between the body segments about an axis causes translation of the locking member relative to the axis of rotation.

16 Claims, 8 Drawing Sheets

U.S. PATENT DOCUMENTS

| | | |
|---|---|---|
| 6,619,876 B2 * | 9/2003 | Vaitkus et al. ............... 403/349 |
| 6,752,562 B2 * | 6/2004 | Mills et al. ............... 403/322.1 |
| 6,893,184 B2 * | 5/2005 | Mills et al. ............... 403/322.2 |
| 6,939,073 B1 * | 9/2005 | Ahmed et al. ................ 403/24 |
| 7,093,998 B2 * | 8/2006 | Dona-Contero et al. .... 403/309 |
| 7,137,280 B2 * | 11/2006 | Capka et al. ................. 70/492 |
| 7,150,596 B2 * | 12/2006 | Diaz et al. ................... 411/344 |
| 2005/0276658 A1 * | 12/2005 | Silva .......................... 403/154 |

\* cited by examiner

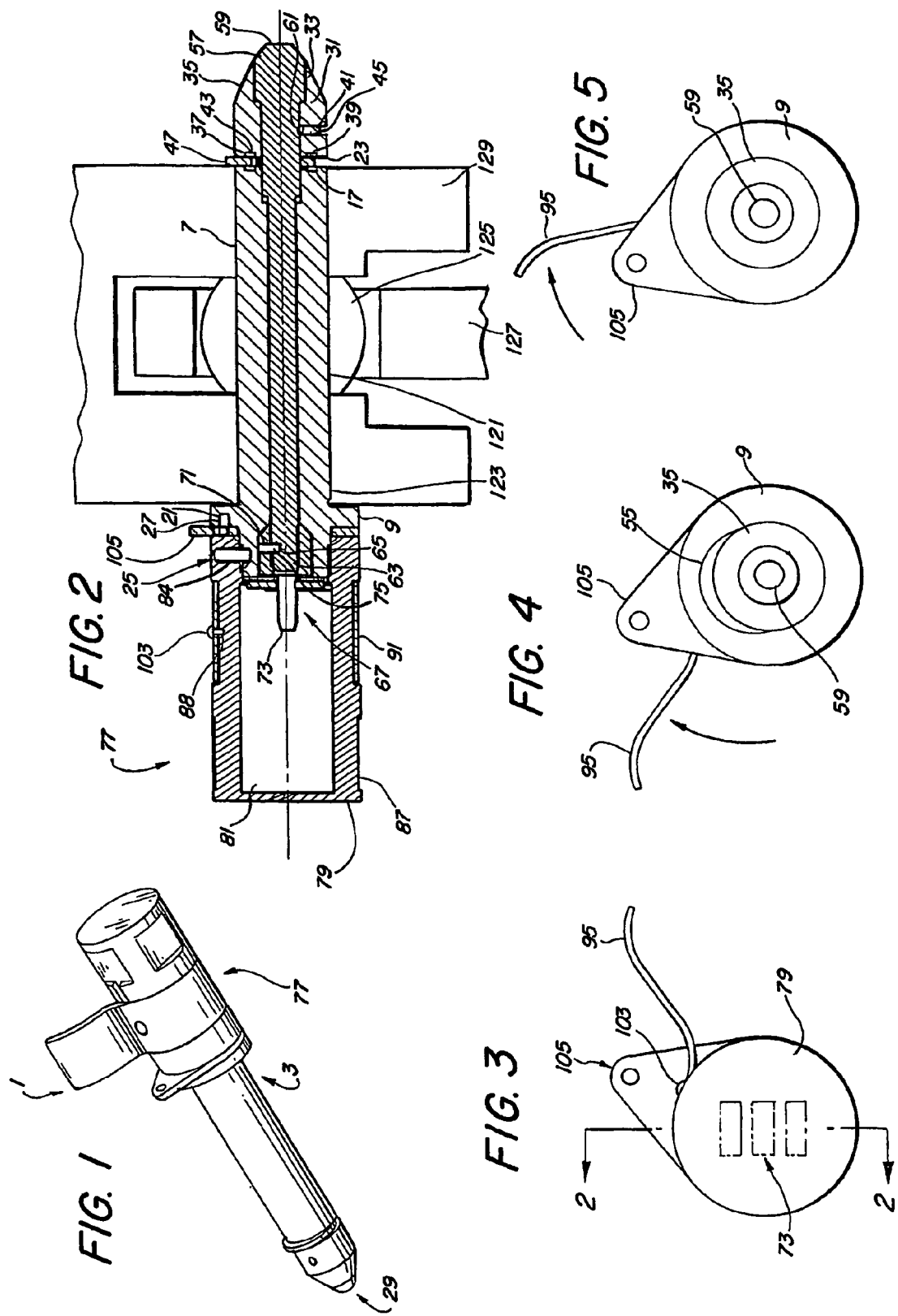

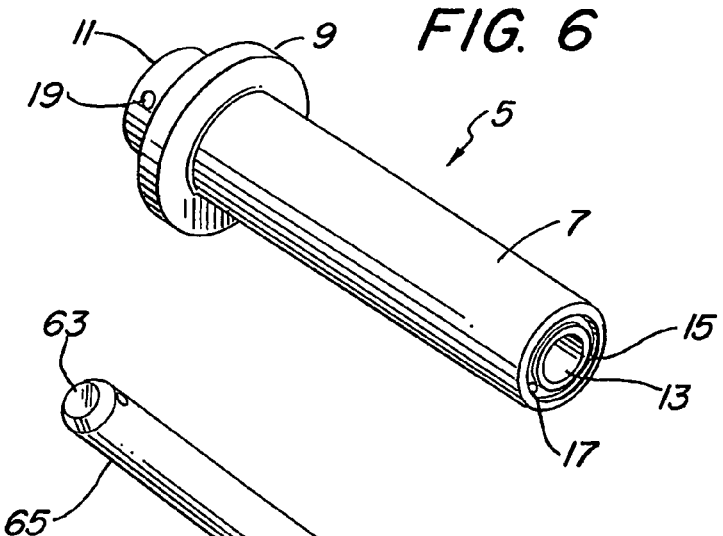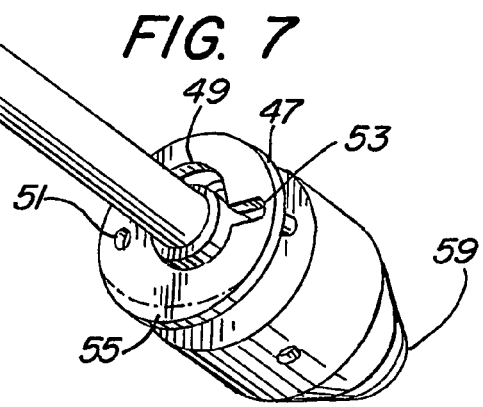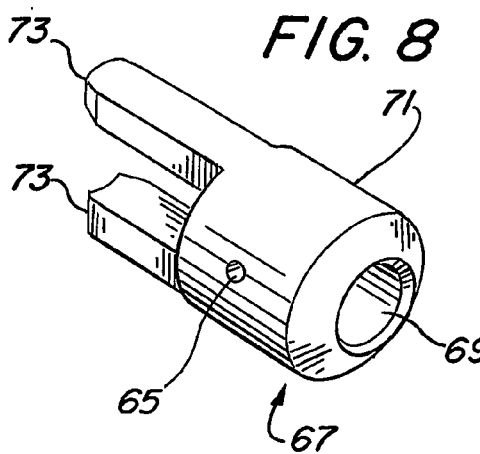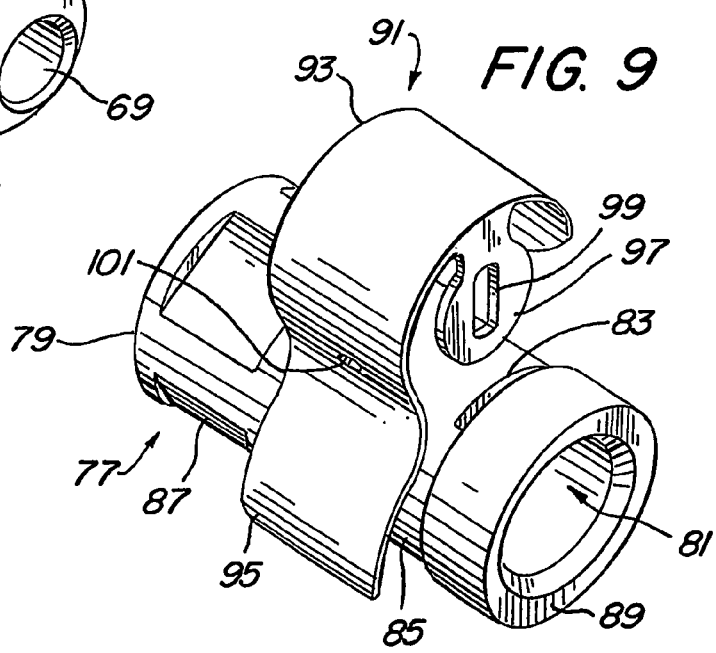

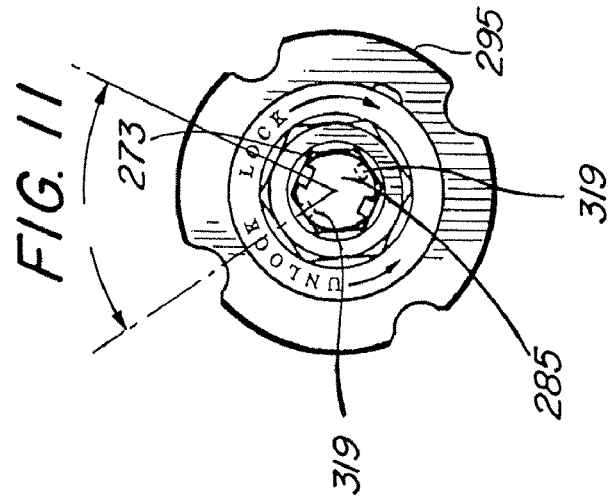
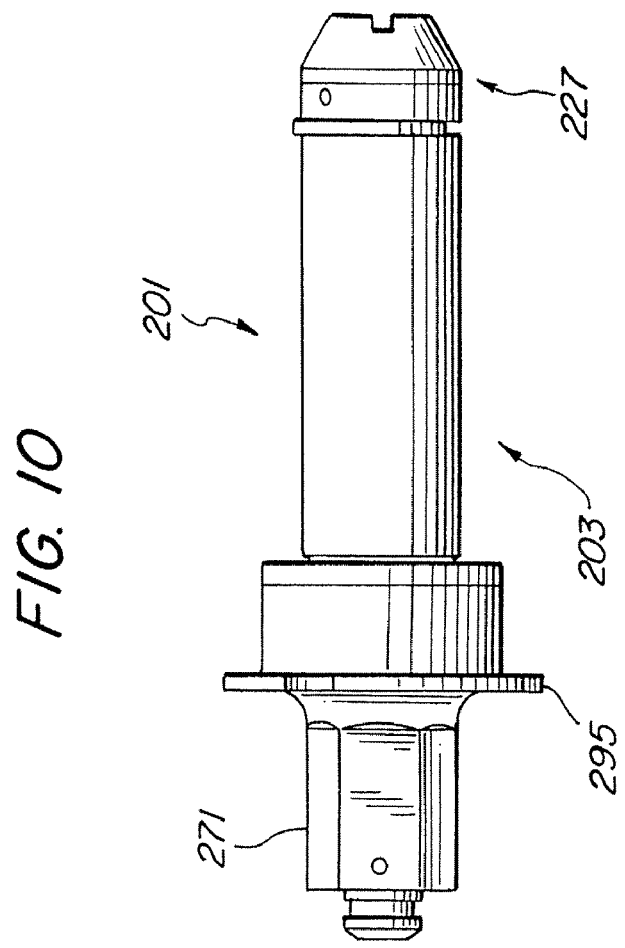

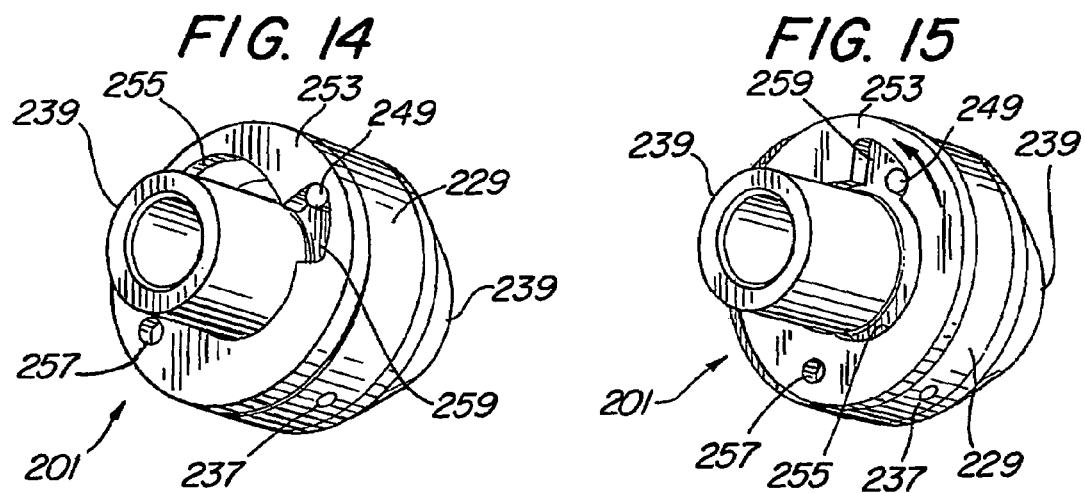
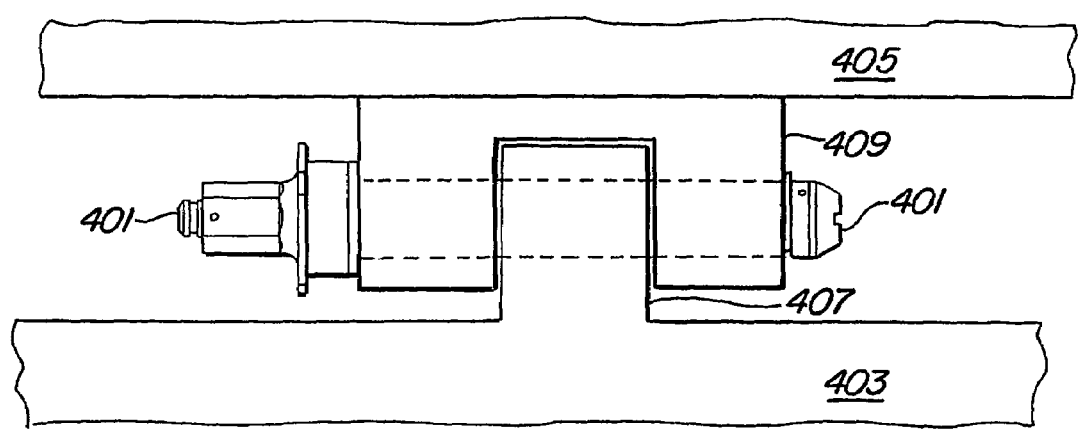

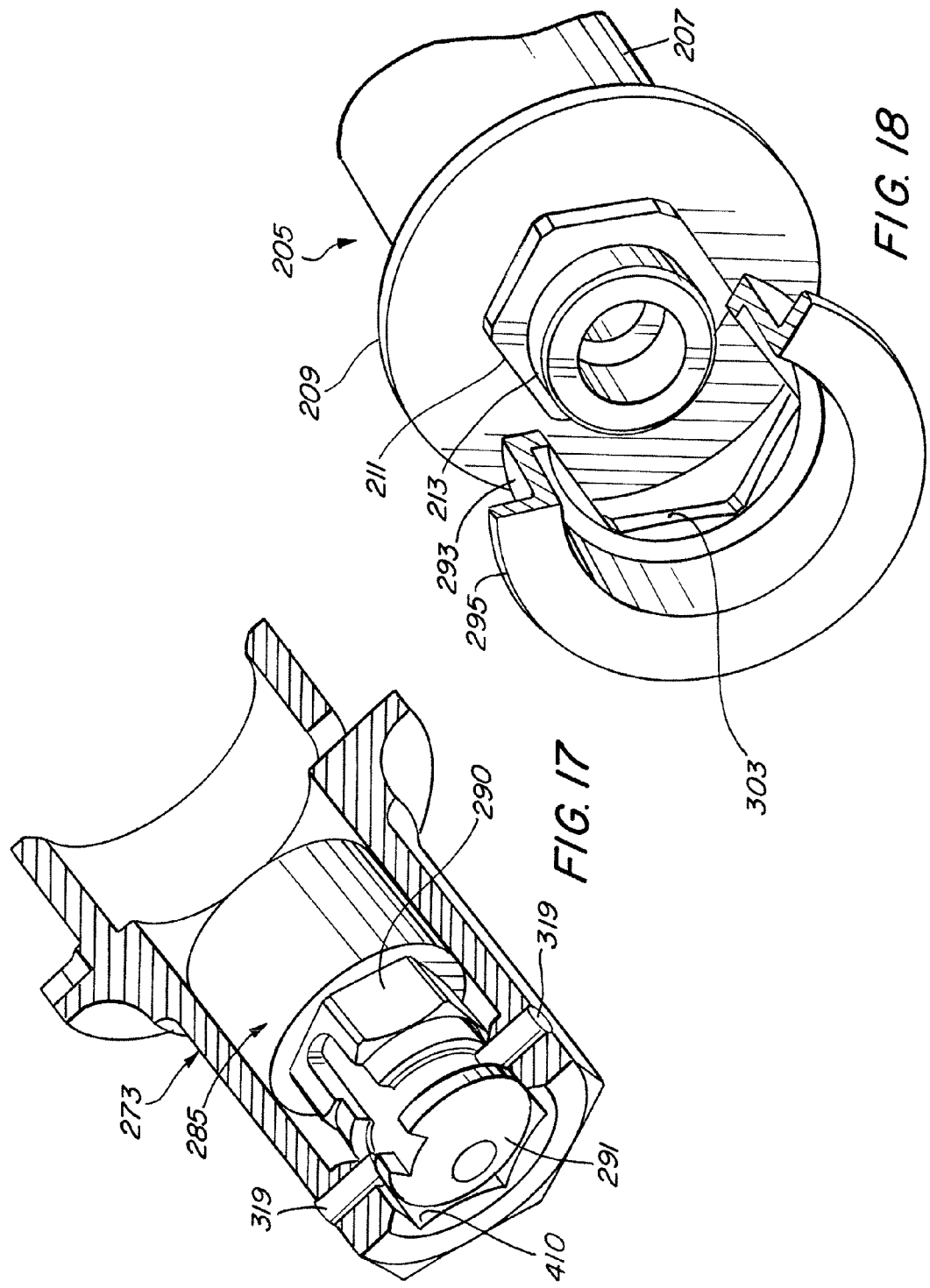

SOLID SHANK PAWL PIN WITH REDUNDANT LOCKING SYSTEM

CROSS-REFERENCES TO RELATED APPLICATIONS

This application claims the benefit of Provisional Application No. 60/470,721, filed May 16, 2003, herein incorporated by reference in its entirety.

FIELD OF THE INVENTION

The present invention relates generally to quick disconnect pins, particularly quick disconnect pins for use in lug and clevis type applications, and more particularly to quick disconnect pins used in aerospace and aircraft structural applications, specifically to the hardware necessary to mount engines, auxiliary power units or other structural sub-assemblies to corresponding attachment points in the airframe.

BACKGROUND OF THE INVENTION

The service environment and readiness of combat aircraft require quick installation and removal of engines and similar sub-assemblies from the aircraft. This operation must be performed at the depot level or in the field, and the personnel involved in the operation may be encumbered by hazardous or extreme environment protective equipment like special suits and gloves. For these reasons, quick disconnect attachment pins used in such instances should not require special tools and should be capable of being installed or removed by a single operator.

Structural attachment points commonly used in aircraft construction are of the lug and clevis type, or a variation thereof. The lug and clevis elements typically have an internal diameter lined with internal bushings. Internal bushings serve to line and protect the underlying structure or roller bearings commonly found in these locations. Installation of the engine or sub-assembly requires that these lugs and devises be brought into alignment so that a pin (clevis pin) can be inserted through the internal diameter and secured in place. Removal of the engine or sub assembly is the reverse of the mounting procedure. Jacks support the weight of the engine or sub-assembly while the lugs and devises are aligned to facilitate insertion or removal of the pin.

Clevis pins previously used in these applications are typically threaded fasteners like shear bolts and nuts, tapered solid pins, or expandable diameter fasteners. Threaded fasteners, by the nature of the threads, do not meet need the need for quick disconnection. Expandable diameter fasteners, even though they are quickly installed, are found to be difficult and time consuming to remove.

As such, whether heretofore recognized or not, there is a need for improved quick disconnect pins, particularly pins suitable for use with lug and clevis type joints of combat aircraft.

SUMMARY OF THE INVENTION

A quick disconnect pin comprising a locking member, a first body segment and a second body segment wherein the first and second body segments are rotatably coupled to each other, and relative rotation between the body segments about an axis causes translation of the locking member relative to the axis of rotation.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIG. 1 is perspective view of a first pin embodying the invention.

FIG. 2 is a cutaway view of the pin of FIG. 1 fastening lug and clevis together.

FIG. 3 is a handle end view of the pin of FIG. 1.

FIG. 4 is a nose end view of the pin of FIG. 1 in a locked position.

FIG. 5 is a nose end view of the pin of FIG. 1 in an unlocked position.

FIG. 6 is a perspective view of the body pin of FIG. 1.

FIG. 7 is a perspective view of the core shaft, pawl washer, and nose of the pin of FIG. 1.

FIG. 8 is a perspective view of the hat of the pin of FIG. 1.

FIG. 9 is a perspective view of the handle and spring clip of the pin of FIG. 1.

FIG. 10 is a perspective view of a second pin embodying the invention.

FIG. 11 is a handle end view of the pin of FIG. 9.

FIG. 14 is a perspective view of the nose and pawl washer of the pin of FIG. 9 in an unlocked position.

FIG. 15 is a perspective view of the nose and pawl washer of the pin of FIG. 9 in an unlocked position.

FIG. 16 is a schematic view of an aircraft subassembly being coupled to a structural member of a combat aircraft.

FIG. 17 is a partial cross sectional perspective of the button in an unlocked position within the handle of FIG. 12;

FIG. 18 is an exploded view of the actuator sleeve and one end of the pin body of FIG. 12.

DETAILED DESCRIPTION OF THE PREFERRED EMBODIMENTS

Figure 12:
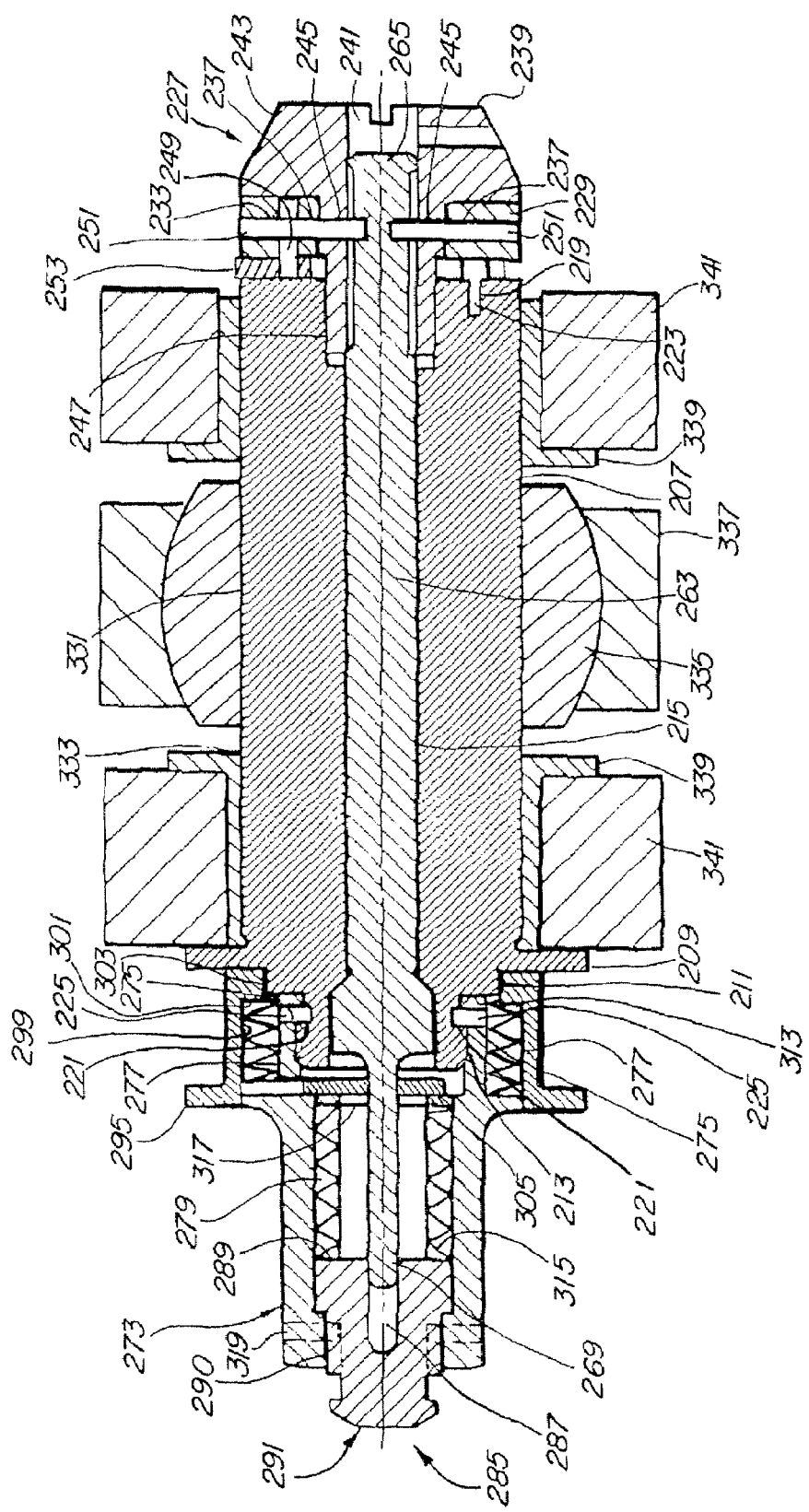
FIG. 12 is a cutaway view of the pin of FIG. 9 fastening lug and clevis together.
Figure 13:
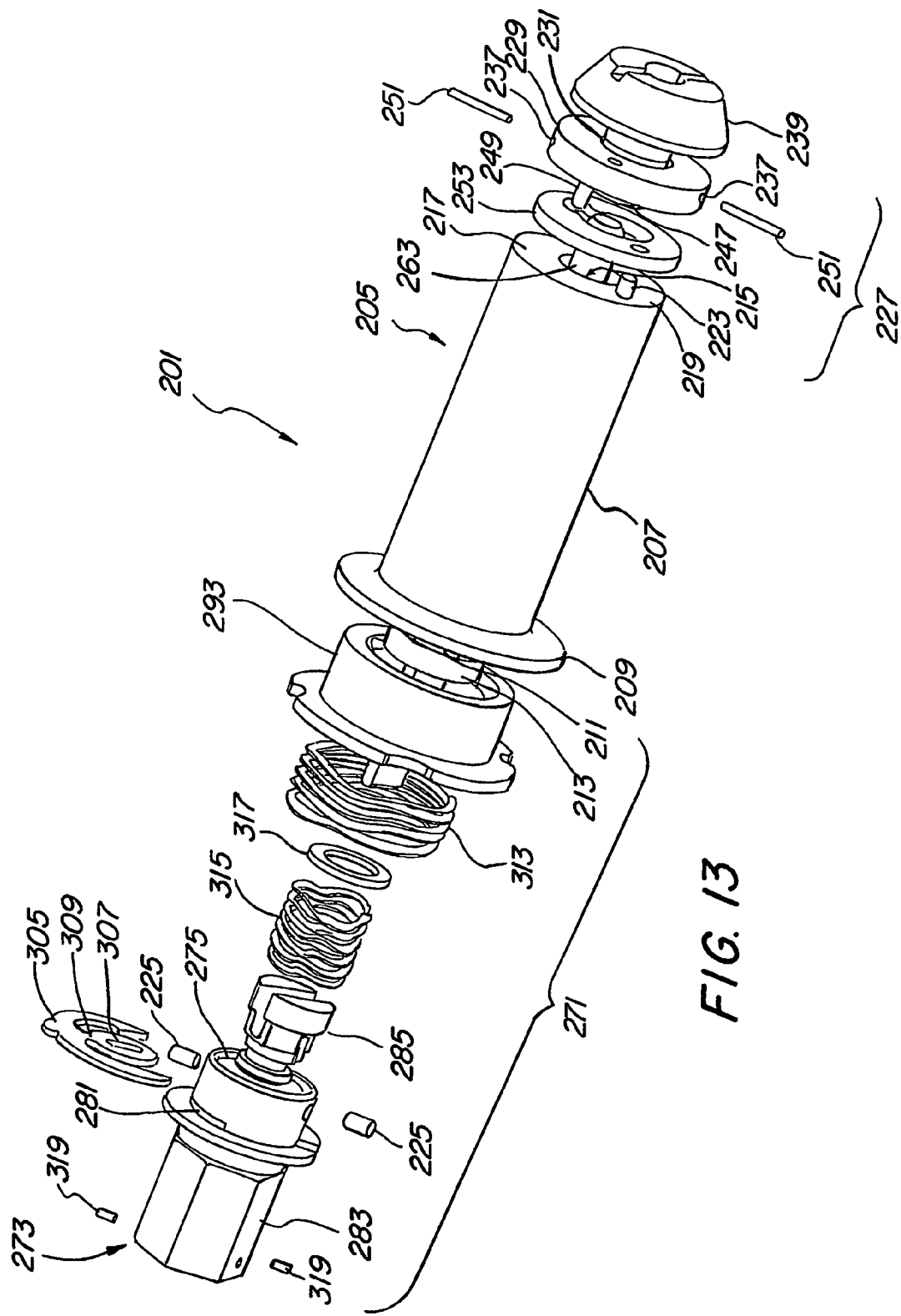
FIG. 13 is an exploded perspective view of the pin of FIG. 9.
Figure 19:
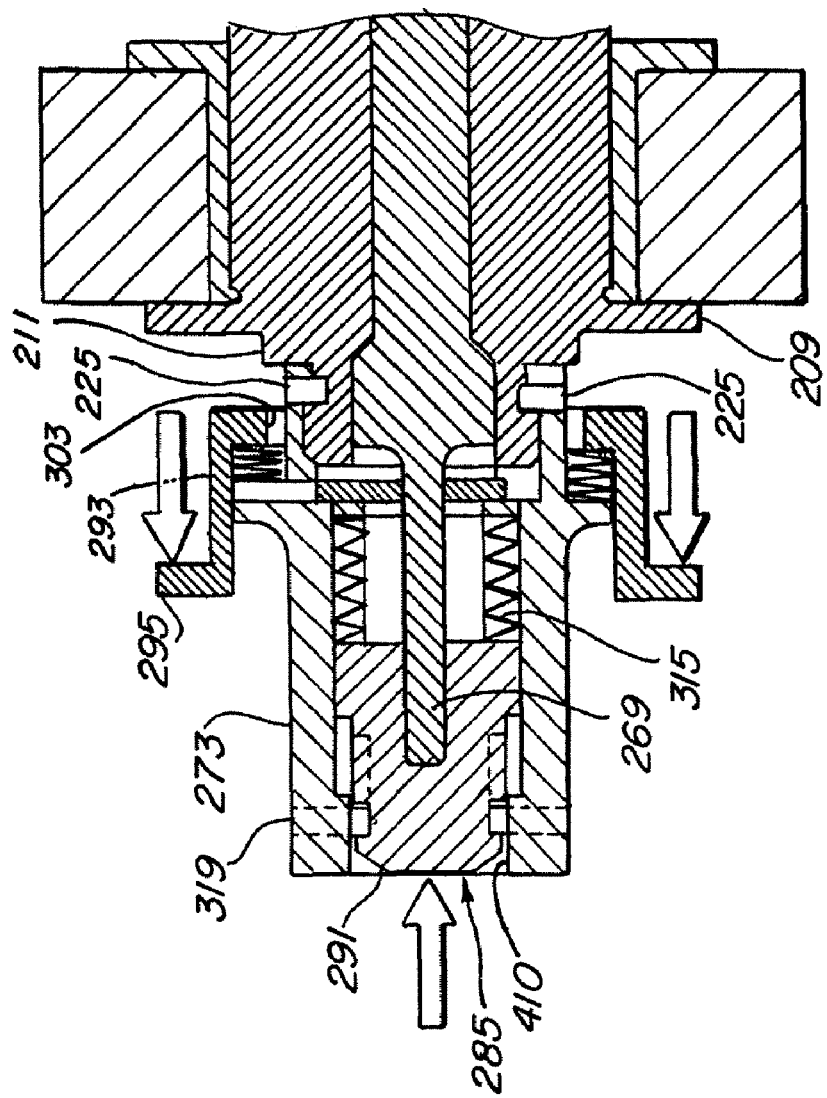
FIG. 19 is a partial cross sectional view of the embodiment of FIG. 12 with the actuator sleeve and plunger in a position to implement either an unlocked or locked state.

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

The present invention is directed to quick disconnect pins that are suitable for insertion into a hole created by the alignment of lugs and clevises, or similar fixtures, such as found in aircraft engine mountings and similar assemblies, and that are adapted to be locked into place without using a separate fastener. Insertion and removal of the pins described herein can be performed at the depot level and in the field, and can be inserted and removed even when the personnel involved in the operation are encumbered by hazardous or extreme environment protective equipment like special suits and gloves. The pins described herein do not require special tools, and are capable of being installed and removed by a single operator. Some embodiments of the pins described herein have two independent means of securing their locking mechanisms to prevent accidental removal, but such means do not prevent installation and removal by a single operator.

Preferred embodiments of the quick disconnect pins described herein do not require multiple rotations of the pin and/or a fastener to lock and unlock it. As such, a preferred quick disconnect pin is one where the relative rotation of the locking elements to translate the system from a "locked" (engaged) position to an "unlocked" (disengaged and ready for removal) position is less than 1 turn. In preferred embodiments, the relative rotation to unlock the pin is preferably less than ½ a turn, is more preferably less than ⅓ a turn, and most preferably is ⅙th of a turn.

Preferred embodiments (such as those of FIGS. 1 and 10) have a cylindrical body pin with a shank having a diameter closely matched to the internal diameter of a particular lug and clevis set defined by a specific application. It is contemplated that a different shank diameter and/or length will be designed for each application. Each pin has a nose assembly located on one end of the pin and a handle assembly located on the other end of the pin. The nose assembly has a tapered shape to aid in the insertion of the pin and a locking mechanism (pawl) that rotates about a pivot point offset with respect to the center axis of the body pin, i.e. that rotates between a concentric position and an eccentric position. Once engaged, the locking mechanism (pawl) bears against the side of the last fitting the pin passes through and prevents removal of the pin. The handle end of the body pin, and/or the handle assembly has a diameter larger than the internal hole diameter of the first fitting the pin passes through to prevent the pin from sliding to far into or through the fitting. The handle assembly includes a latching mechanism that prevents accidental unlocking of the pin. The handle assembly and the nose assembly are connected by an internal core pin element that rotates inside the body pin and transmits, at least when the locking mechanism is unlatched, torque from the handle assembly to the locking mechanism in the nose assembly. Other mechanical elements are conveniently positioned to secure the different assemblies in place.

A first pin embodying the invention is shown in FIG. 1-9. In the figures, quick disconnect pin 1 comprises body assembly 3, nose assembly 29, and handle assembly 77. In FIG. 2, pin 1 is shown inserted through holes 121 and 123 of lug bushing 125 of lug 127 and clevis 129.

Body assembly 3 comprises body pin 5, pivot pin 23, handle retaining pin 25, and lanyard pin 27. Body pin 5 comprises a shank 7, a flange 9, and a handle coupling segment 11. Body pin 5 also comprises a central bore 13, a drive pin groove 15, a pivot pin hole 17, a handle retaining pin hole 19, and lanyard washer pin hole 21.

Nose assembly 29 comprises nose 31, drive pin 43, core shaft retaining pin 45, lock ring (pawl) 47, core shaft 57, hat 67, and hat retention pin 75. Nose 31 comprises a central bore 33, a tapered tip 35, a drive pin hole 37, a pivot pin groove 39, and core shaft retaining pin hole 41. Lock ring 47 comprises a core shaft cutout 49, a pivot pin hole 51, drive pin slot 53, and retention region 55. Core shaft 57 comprises nose end 59, nose pin hole 61, hat end 63, and hat pin hole 65. Hat 67 comprises core shaft receiving portion 69, pin hole 71, and paddles 73.

Handle assembly 77 comprises handle 79, spring clip 91, spring clip pin 103, and lanyard washer 105. Handle 79 comprises central cavity 81, access slot 83, pin hole 84, clip coupling surface 85, wrench receiving portion 87, spring clip pin hole 88, and lanyard surface 89. Spring clip 91 comprises handle coupling portion 93, flex handle 95, actuator 97 with paddle slot 99, and pin hole 101.

Pin 1 is preferably assembled by pushing drive pin 43 into pin hole 37 of nose 31, and sliding nose 31 onto the end of core shaft 57 by causing the hat end to pass through the central bore 33 of nose 31. The nose end of core shaft 57 and the central bore 33 are preferably shaped to mate with each other in a manner that prevents the nose end of core shaft 57 from pulling through nose 31. Although core shaft retaining pin 45 will eventually be used to pin nose 31 to shaft 57 in a manner that prevents relative movement between the nose 31 and shaft 57, inserting the pin is done at the end of the assembly process. Core shaft 57 is also caused to pass through the shaft cutout 49 of lock ring 47, either after shaft 57 is passed through bore 33 of nose 31 or while shaft 57 is passed through bore 33 of nose 31. After the nose 31 and lock ring 47 are in place, body pin 5 with pivot pin 23 in hole 17 is positioned on shaft 57 such that pivot pin 23 passes through pivot pin hole 51 of lock ring 47, and into pivot pin groove 39, while drive pin 43 of nose 31 passes through drive pin slot 53 of lock ring 47 and into drive pin groove 15 of body pin 5. With shaft 57 passing through bore 13 of body pin 5, hat 67 having a threaded shaft receiving portion 69 is threaded onto the hat end 63 of shaft 57, at which point holes 71 and 65 are drilled into the hat 67 and the shaft 57, and the hat retention pin 75 is driven into them to prevent disassembly. Spring clip 91 is coupled to clip coupling surface 85 of handle 79 such that actuator 97 passes through slot access slot 83. The lanyard washer 105 is positioned on body pin 5 with lanyard pin 27 in lanyard washer pin hole 21. The handle assembly is then screwed onto the threaded handle coupling segment 11 of the body pin 5 with paddles 73 of hat 67 position in paddle slot 99 of actuator 97. Once screwed onto the body pin 5, holes 19 and 84 are drilled and handle 79 pinned onto body pin 5 to prevent disassembly. At this point, rotation of spring clip 91 on handle 79 causes actuator 97 to rotate with handle 79. This in turn causes rotation of core shaft 57 which will ultimately (once assembly is complete) result in rotation of nose 31 and movement of lock ring 47. At this stage spring clip 91 is rotated to the "locked position" such that spring clip pin hole 88 is positioned on spring clip pin 103, the nose 31 and body pin 5 are rotated so that the lock ring 47 projects outward to the maximum extent possible, and holes 41 and 61 are drilled, and nose 31 pinned to shaft 57 to ensure that shaft 57 and nose 31 are fixed relative to each other. At this point, assembly of pin 1 is essentially complete.

Once assembled, lock ring 47 can be moved from a "locked" eccentric position to an "unlocked" concentric position by pushing flex handle 95 of spring clip 91 such that it lifts off of pin 103 and causes spring clip 91 to rotate around handle 79. This is illustrated in FIGS. 4 and 5 with the pin 1 being latched in a locked position in FIG. 4, and being unlocked in FIG. 5. Reversing the process causes the lock ring to move from the unlocked position to the locked position with hole 101 of spring clip 91 and spring clip pin 103 interacting to latch pin 1 in the locked position.

In moving between locked and unlocked positions, lock ring 47 rotates around the center axis of pivot pin 23 rather than the center axis of quick disconnect pin 1 due to the movement of pivot pin 23 and drive pin 43 towards each other as the body pin 5 and nose 31 are rotated on the center axis of pin 1. Rotation around pivot pin 23 results in a translation of lock ring 47 relative to core shaft 57 and also to drive pin 43. Core shaft cutout 49 and drive pin slot 53 are shaped to facilitate such movement. It should be noted that alternative embodiments may reverse the functionality of pins 43 and 23 such that the drive pin is coupled to the body pin 5 and the pivot pin to nose 31.

Since the body pin 5 cannot rotate relative to handle 79, and nose 31 cannot rotate substantially relative to spring clip 91, relative rotation between spring clip 91 and handle 79 results in the same relative rotation between the body pin 5 and nose 31, and locking and unlocking pin 1 requires relative movement between the handle 79 and spring clip 91. As such, handle 79 includes wrench receiving portion 87 so that a wrench or other tool may be used to prevent rotation of handle 79 and body pin 5 while spring clip 91 is being rotated around handle 79. Thus, pin 1 can be actuated by one person using a wrench in one hand and a bare or gloved hand to operate the spring lip with the other.

A second pin embodying the invention is shown in FIGS. 10-15 and 17-19. Quick disconnect pin 201 comprises body assembly 203, nose assembly 227, and handle assembly 271. In FIG. 12, pin 201 is shown inserted through holes 331 and 333 of lug bushing 335 of lug 337 and clevis bushings 339 of clevis 341.

Body assembly 203 comprises body pin 205, pivot pin 223, and handle retaining pins 225. Body pin 205 comprises a shank 207, a flange 209, an actuator sleeve mating portion 211, and a handle coupling segment 213. Body pin 205 also comprises a central bore 215, a pivot pin hole 219, and handle retaining pin holes 221.

Nose assembly 227 comprises nose bushing 229, nose 239, drive pin 249, core shaft retaining pins 251, lock ring (pawl) 253, and core shaft 263. Nose bushing 229 comprises central bore 231, a drive pin hole 233, and core shaft/nose retaining pin holes 237. Nose 239 comprises a central bore 241, a tapered tip 243, and core shaft/bushing retaining pin holes 245, and body pin extension 247. Lock ring 253 comprises a core shaft cutout 255, a pivot pin hole 257, drive pin cutout 259, and retention region 261. Core shaft 263 comprises nose end 265, nose pin holes 267, and handle end 269.

Handle assembly 271 comprises handle 273, plunger 285, actuator sleeve 293, actuator 305, actuator sleeve spring 313, plunger spring 315, washer 317, and plunger retention pins 319. Handle 273 comprises body pin cavity 275, actuator sleeve spring surface 277, plunger cavity 279, actuator slot 281, and wrench receiving portion 283. Plunger 285 comprises core shaft receiving slot 287, spring surface 289, handle mating portion 290, and button extension 291. Actuator sleeve 293 comprises flange 295, actuator lug receiving groove 297, spring surfaces 299 and 301, and body pin mating segment 303. Actuator 305 comprises core shaft slot 307, and lug 309.

Pin 201 is similar to pin 1, at least in regard to a core shaft being used to translate torque applied at the handle end into relative rotation of the nose relative to the body pin and into movement of a locking pin between a concentric and an eccentric position. Pin 201 differs from pin 1 primarily in regard to how it is latched in the locked position, but also in regard to how it is assembled.

Core shaft 263 of pin 201 includes a flat segment at handle end 269 and is threaded at the nose end 265. As such, pin 201 is preferably assembled by inserting core shaft 263 into bore 215 of body pin 205 and, with pins 223 and 249 in place in holes 219 and 233, and with lock ring 253 and bushing 229 in place on nose 239, screwing nose 239 onto the threaded nose end 265 of shaft 263. Since nose 239 is screwed onto shaft 263, bushing 229 is included to provide an anchor for drive pin 249 that need not rotate as nose 239 is fastened to shaft 263. Nose 239 and bushing 229 will later be pinned to shaft 263. To complete the assembly of pin 201: plunger 285 and plunger spring 315 are inserted in plunger cavity 279; washer 317 is positioned on shaft 263; actuator 305 is positioned on handle 273 such that lug 309 comprising shaft slot 307 extends through actuator slot 281 into body pin cavity 275; actuator sleeve 293 and actuator sleeve spring 313 are positioned between handle 273 and flange 209 of body pin 205; and handle 273 is screwed onto body pin 205 and then pinned in place using pins 225.

Handle assembly 271 contains two lock latching mechanisms. The first is the actuator sleeve 293 external to the handle 273 and capable of being operated by hand, and the second is the plunger 285. (In an alternative embodiment, the spring clip of pin 1 could be used in place of the actuator sleeve of pin 2.) The slot 287 of plunger 285 is of adequate dimensions and is positioned to receive the flat handle end 269 of the core shaft 263. As such, core shaft 263 cannot rotate if plunger 285 cannot rotate. Actuator 305 is fixed relative to actuator sleeve 293 such that it cannot rotate if sleeve 293 cannot rotate. The flat handle end 269 of core shaft 263 extends through the score shaft slot 307 of actuator 305. As such, core shaft 363 cannot rotate if actuator sleeve 293 cannot rotate.

Since core shaft 263 cannot rotate unless both plunger 285 and actuator sleeve 293 are able to rotate, the plunger 285 and sleeve 293 can be used to latch the pin in a locked position by ensuring that they do not, when the pin is latched, rotate relative to body pin 5. If they cannot rotate relative to body pin 5, core shaft 263 cannot rotate relative to body pin 5, and nose busing 229 and nose 239 cannot rotate relative to body pin 5. Without relative rotation between the components anchoring the pivot and drive pins, the lock ring cannot be moved.

Plunger 285 is a cylindrical body with a major diameter and a minor diameter. A hexagonal shape is on the center section of the major diameter (handle mating portion 290) to engage a hexagonal detent 410 inside the handle 273. Plunger spring 315 biases plunger 285 such that it remains engaged with the hexagonal detent 410 unless button extension 291 is used to push the plunger 285 further into plunger cavity 279 to disengage the handle mating portion 290 from the hexagonal detent 410. See FIG. 17. The user can press the button extension 291 with a thumb or a tool.

Similarly, actuator sleeve 293 includes body pin mating segment 303 which is sized and shaped to mate with the actuator sleeve mating portion 211 of body pin 205. Actuator sleeve spring 313 biases actuator sleeve 293 towards body pin 205. As such, to disengage hexagonally shaped segment 303 from hexagonally shaped portion 211, flange 295 is used to pull actuator sleeve 293 away from body pin 205. See FIG. 18.

An end of the handle 273 has a wrenching feature (wrench receiving portion 283 of handle 273) capable of engaging a typical socket wrench found in mechanics tool boxes. The plunger 285 is released when a socket wrench is positioned on the end of pin 201. Placing a wrench on the end of pin 201 may be done to resist the torque generated when releasing the primary lock latching mechanism, i.e. actuator sleeve 293. The two latching mechanisms are arranged in such a way that releasing one mechanism by itself is insufficient to permit the lock ring to be moved from a locked to an unlocked position.

During installation and removal, an operator engages a wrench to the end of the handle 273 and in so doing disengages plunger 285 from the detent of handle 273. See FIGS. 17 and 19. While holding the wrench to prevent rotation and displacement of the pin 201, the operator pulls the actuator sleeve 293 out of engagement with body pin 205, and rotates the actuator sleeve 293 about the outer periphery of the handle 273 from an unlocked position to a locked position. The internally located core shaft 263, slave to the actuator sleeve action, transmits rotation to the washer like lock ring 253 located within the nose assembly 227 at the other end of the solid pawl pin 2. The lock ring 253 pivots on pivot pin 223 located off center to the longitudinal axis of the pin 2. The rotation of the core shaft 263 translates into a translation of the lock ring 253. The translation of the lock ring 253 is such that when the actuator sleeve 293 moves from an unlocked position to a locked position, the lock ring 253 moves from a position essentially concentric with the axis of the body pin 205, to a locked position where retention region 261 of the lock ring 253 extends beyond the circumference of the body pin 205. The protruding portion 261 of the lock ring 253 creates a shear engagement area to react against any fitting the pin passes through to prevent longitudinal displacement of the body pin 205 and to secure an engine or other assembly in place. The internal hex of the actuator sleeve 293 engages an external hex of the body pin 205 when released, by the operator. When the operator removes the wrench, the plunger 285 automatically engages handle 273 as the wave spring action of spring 315 displaces the plunger 285 into engagement with the female hexagonal detent internal to the handle 273.

Unlocking pin 201 for removal is the reverse of the above-described actions. The operation begins by engaging the wrench into the handle recess. This action automatically releases the secondary lock by pushing the plunger 285 forward to disengage it from the hexagonal detent inside the handle 273. The operator then rotates actuator sleeve 293 with the other hand through an arc of approximately sixty degrees to an unlocked position. See FIGS. 11 and 19. The rotation is transmitted by the core shaft 263, which is slave to actuator sleeve 293 and the hexagonal plunger 285, to the lock ring 253 at the other end of the pin 201. The lock ring 253 translates to an unlocked position essentially concentric with shank 7 of body pin 5. The pin 201 is now ready for removal by pushing/pulling the pin through the fitting hole(s). Removal of the wrench from the quick disconnect pin 201 releases the pressure on the wave spring 315 and the plunger 285 automatically engages the internal hexagonal detent in the handle 273. At the same time, actuator sleeve 293 engages the next set of flats in the hexagonal detent of the body pin 205, so that the pin assembly 201 is also secure in the unlocked position. See FIG. 12.

In preferred embodiments, one or more visual indicators will make it possible to visually determine whether a quick disconnect pin is locked or not, without having to look at the current position of the lock ring. Visual verification is found in pin 201 in regard to the relative position of the external spring clip with respect to the external locking pin on the periphery of the handle, as the relative position of the clip to the spring is a good visual indicator of either "locked" or "unlocked" condition of pin 1. In pin 201, two retention pins 319 cooperate with the "locked" and "unlocked" labels to provide visual indication as to whether the lock ring is deployed. See FIGS. 17 and 19 wherein the button extension 291 is recessed into the handle in the unlocked position when held by the retention pins 319 within the button extension groove. Alternatively, pin 201 could be configured such that plunger would remain pushed into the handle if the lock ring was not deployed. Still other embodiments might include other types of visual indicators, and/or non-visual indicators to display status. In some instances, the pin may be adapted to communicate its current state to some other apparatus, possibly via an electronic signal.

It is contemplated that some embodiments of quick release pins may not include a handle assembly or a core shaft. In some such embodiments, a nose would rotate relative to a body pin with such rotation being used to lock and unlock the pin via a lock ring in a manner similar to pins 1 and 201. However, the relative rotation would likely result from directly rotating the nose while holding the body pin stationary, or rotating the body pin while holding the nose stationary. Holding the pin and/or nose stationary might require access to both the pin and nose, or might result from the pin and/or nose interacting with its environment in a manner to inhibit rotation.

Each of the pins described herein is particularly well suited for use as an engine mount pin that is quickly disconnected to remove an engine or similar assembly from an airframe. In a typical application, the invention fulfills the requirements of a quick disconnect system for the removal and servicing of jet engines in fighter aircraft, but it can also be found useful in commercial aircraft and other related applications. Installing and/or removing the pins described herein does not require the use any special tools other than what is normally found in a mechanic's toolbox. The invention has the integrity and strength of a threaded fastener with the quick actuation of the expandable diameter fastener.

FIG. 16 provides a schematic view of a pin 401 being used to couple an aircraft subassembly 403 to frame 405 via lug 407 and clevis 409. Subassembly 403 may be any type of subassembly including but not necessarily limited to an engine mount, a hatch cover, a drop out link, and a blade attachment pin. Frame 405 may be replaced by any other portion of an aircraft. Lug 407 and/or clevis 409 may be replaced by one or more other fixtures that can be coupled together using a quick disconnect pin such as those described herein.

As the pins described herein are suitable for use with any fixtures that can be coupled together using such a pin, it is contemplated that the pins described herein may be used in other vehicles, and are also applicable to forming non-vehicle assemblies. Examples of some other contemplated uses include coupling objects in land vehicles, space craft, water craft, and other vehicles, as well as coupling objects in stationary structures or structures that are moveable but not self-propelled.

The elements of the pins described herein may comprise any material or combination of materials. However metallic parts are currently preferred. Elements shown as single piece units may be replaced with multi-piece assemblies. The sizes and dimensions of the elements may vary between embodiments.

Although the quick disconnect pins described herein comprise numerous novel features that are evident from the descriptions and figures included herein, some features are of particular interest.

It is contemplated that the structures of body pins will vary between embodiments depending on the application a particular embodiment is designed for. As such, different embodiments will vary at least in regard to shaft length and diameter, with the length and diameter being such so as to ensure a close fit of the body pin in the holes of the fixtures it is to pass through, and to ensure that the body pin extends substantially all the way through the holes.

By ensuring that the diameter of the body pin shank closely matches the diameter of the holes it passes through, forces imparted on the pin shank are less likely to be transferred to the lock ring or any other portion of quick disconnect pin assembly. However, the body pin shank needs to pass through the holes with sufficient clearance to permit insertion and removal in extreme environmental conditions. As such preferred embodiments will have a shank diameter that is less than or equal to the diameter of the holes it is to pass through. The shank of the body pin should be sufficiently long so as to extend through holes but is preferably not overly long. As such the length of shaft of the body pin is preferably substantially equal to the distance between opposite external surfaces of the fixture (typically a clevis) it is to pass through.

The embodiments of the present invention described herein comprise multiple novel features with each described embodiment including either a single such feature or a combination of such features. Other contemplated embodiments include all combinations of one or more such novel features not explicitly described herein as such combinations are readily discernable from the embodiments described. In light of the various contemplated embodiments, the present invention can be characterized in a number of ways with the following paragraphs providing examples of some such characterizations.

The present invention may be characterized as a quick disconnect shear pin for use in engine support structures of aircraft and similar assemblies. In some instances it may also be characterized as comprising an automatic internal locking system that is not in the same load path as the external locking system. In such instances, it may also be characterized as comprising an external locking system that is independent from the internal locking system. In the previously described or other instances, it may be characterized as further comprising the components and methods to actuate a locking pawl attached to the extremity of the shear pin remote to the extremity of the shear pin where the actuation and locking mechanisms are located. In such or other instances it may be characterized as comprising the manufacturing methods to make an essentially cylindrical spring clip shape with a tab essentially perpendicular to the longitudinal axis of the pin. In such or other instances it may be characterized as a manufacturing method used to manufacture actuator mechanisms with shapes other than essentially cylindrical shapes.

The present invention may also be characterized as a pin comprising a pawl and providing visual indication of whether the pawl deployed or not.

Another characterization of the present invention is as a quick disconnect pin comprising a locking member, a first body segment and a second body segment wherein the first and second body segments are rotatably coupled to each other, and relative rotation between the body segments about an axis causes translation of the locking member relative to the axis of rotation. In such instances the translation of the locking member may result from rotation of the locking member about an axis offset from the axis of rotation of the body segments. In such instances, the pin may in some instances be further characterized as comprising a latching mechanism that can be moved between a latched and an unlatched state, and while in the latched state inhibits relative rotation between the body segments. In some instances the pin may be characterized in that the latching mechanism can be moved from the latched to the unlatched state by applying at least one force that is not a rotational force about the axis of rotation of the body segments. Such pins may in some instances be characterized as including a latching mechanism that is moved from the latched to the unlatched state by application of at least two oppositely directed linear forces along the axis of rotation of the body segments, and in some instances moved from the latched to the unlatched state by pushing a first member of the mechanism towards the locking member and pulling a second member of the mechanism away from the locking member. Alternatively, such pins may be characterized as including a latching mechanism that is moved from the latched to the unlatched state by forcing a member of the latching mechanism biased towards the axis of rotation of the body segments away from the axis of rotation of the body segments, and in some instances the latching mechanism forced away from the axis of rotation is coupled to the body segments such that rotation of the member relative to the first body segment causes rotation of the second body segment relative to the first body segment.

The present invention may also be characterized as a quick disconnect pin comprising a nose, a body, and a latching mechanism having at least a latched and an unlatched state, wherein the nose and body are rotatably coupled together such that, while the latching pin is in the unlatched state, the nose and body can be rotated relative to each other, and while the latching mechanism is in the latched state, cannot be rotated relative to each other.

Yet another characterization of the present invention is that it is a quick disconnect pin comprising a body having a central axis, a shaft passing through the body, and a pawl adjacent to the body, wherein the pawl has a center and is moveable between a first position and a second position such that movement from the first position to the second position results in the center of the pawl moving away from the central axis, and movement from the second position to the first position results in the center of the pawl moving toward the central axis.

Still another is that it is a quick disconnect pin comprising a body and a locking member wherein the locking member moves from a locked to an unlocked position by application of a first force to unlatch the locking member, and a second force to move the locking member from the locked to the unlocked position.

The present invention may also be characterized as a vehicle comprising two assemblies coupled together by a quick disconnect pin such that the pin inhibits relative movement between the assemblies, wherein: the pin comprises a locking member, a nose and a body; the nose and body are rotatably coupled to each other, and relative rotation about an axis of the nose and body causes translation of the locking member relative to the axis of rotation; and the locking member comprises at least a first position and a second position such that, while in the first position, it inhibits removal of the pin from the vehicle, and while in a second position, does not inhibit removal of the pin from the vehicle. In some such instances the vehicle is an aircraft, and in some instances, one of the assemblies is an engine assembly.

The present invention may also be characterized as a quick disconnect pin comprising a latching mechanism having a locked and an unlocked stated, and a latching mechanism adapted to inhibit the locking mechanism from transitioning from the locked state to the unlocked state. In some instances it may also be characterized in having a latching mechanism that is also adapted to inhibit the locking mechanism from transitioning from the unlocked state to the locked state.

Another characterization of the present invention is that it is a quick disconnect pin comprising coaxial members wherein the pin is adapted to transition between a locked and an unlocked state by rotating the coaxial members about their common axis by less than X degrees relative to each other where X is one of 360, 270, 180, 90, 80, and 60.

What is claimed is:

1. A quick disconnect pin comprising:
   a locking member;
   a first body segment;
   a second body segment wherein the first and second body segments are rotatably coupled to each other, and relative rotation between the body segments about an axis causes translation of the locking member relative to the axis of rotation; and
   a latching mechanism which moves between a latched and an unlatched state, and while in the latched state inhibits relative rotation between the body segments, wherein the latching mechanism is moved from the latched to the unlatched state by simultaneously pushing a plunger member of the latching mechanism towards the locking member and pulling an actuator sleeve member of the latching mechanism away from the locking member along the axis of rotation of the body segments to the latching mechanism, such that translation of the plunger member and actuator sleeve member enables actuation by rotation of the locking member for either locking or unlocking of the pin member.

2. The quick disconnect pin of claim 1 wherein translation of the locking member results from rotation of the locking member about an axis offset from the axis of rotation of the body segments.

3. The quick disconnect pin of claim 1 wherein the latching mechanism can be moved from the latched state to the unlatched state by applying forces that are not rotational forces about the axis of rotation of the body segments.

4. The quick disconnect pin of claim 1 wherein translation of the locking member is accomplished by a relative rotation of the body members about the common axis by less than X degrees relative to each other where X is 80.

5. The quick disconnect pin of claim 1 further including a spring assembly for biasing the latching mechanism to a locked state.

6. The quick disconnect pin of claim 1 further including a first spring member to bias the plunger member to a latched state and a second spring member to bias the actuator sleeve member to a latched state.

7. The quick disconnect pin of claim 6 wherein each of the first and second spring members include a set of wavy spring rings.

8. The quick disconnect pin of claim 1 further including a handle member connected to one of the first and second body segments, the plunger member is releasably retained within the handle member.

9. The quick disconnect pin of claim 1 further including an actuator sleeve connected to one of the first and second body segments, the actuator sleeve is releasably mounted over a portion of one of the first and second body segments.

10. The quick disconnect pin of claim 1 further including a visual indicator of the locked state on a surface of the quick disconnect pin.

11. In an apparatus comprising two assemblies coupled together by a quick disconnect pin assembly such that the pin inhibits relative movement between the two assemblies, when operatively mounted in a hole extending through the two assemblies, the improvement of a pin assembly comprising:
   a locking member;
   a nose;
   a body, the nose and body are rotatably coupled to each other, and relative rotation about an axis of the nose and body causes translation of the locking member relative to the axis of rotation, the locking member moves between at least a first position and a second position such that, while in the first position, it inhibits removal of the pin from the hole, and while in a second position, does not inhibit removal of the pin from the hole; and
   a latching mechanism which moves between a latched state and an unlatched state to control movement of the locking member, the latching mechanism while in the latched state inhibits movement of the locking member, wherein the latching mechanism is only moved from the latched to the unlatched state by pushing a plunger member of the latching mechanism towards the locking member and pulling an actuator sleeve member of the latching mechanism away from the locking member, such that translation of the plunger member and actuator sleeve member enables actuation by rotation of the locking member for either locking or unlocking of the pin member pushing a plunger member of the latching mechanism towards the locking member and pulling an actuator sleeve member of the latching mechanism away from the locking member, such that translation of the plunger member and actuator sleeve member enables actuation by rotation of the locking member for either locking or unlocking of the pin member.

12. A quick disconnect pin comprising:
   an elongated pin member having a nose assembly at a first end of the pin member;
   a locking member is rotably mounted at an off-center position in the nose assembly from a center axis of the pin member;
   a handle assembly operatively connected to a second end of the pin member, the handle assembly is operatively connected to the locking member to enable rotation of the locking member from an unlocked state to a locked state; and
   a latching mechanism which moves between a latched state and an unlatched state to control movement of the locking member, the latching mechanism while in the latched state inhibits movement of the locking member, wherein the latching mechanism is only moved from the latched to the unlatched state by movement of a first member and a second member by a user, the first member and second member are biased to a latched state and must be moved against the applied bias to enable the unlatched state wherein the user can subsequently rotate the locking member to one of the unlocked state and the locked state when in the unlatched state, wherein the first member includes a button member spring-biased to extend from the handle assembly and the second member includes a flanged member spring-biased to contact the pin member, such that the flanged member is pulled to unlock the pin member and the button member is pushed towards the handle assembly to unlatch the latching mechanism and enable actuation by rotation of the locking member for either locking or unlocking of the pin member.

13. The quick disconnect pin of claim 12 wherein the locking member has a non-circular opening to enable an off center rotation.

14. The quick disconnect pin of claim 13 wherein the nose assembly has a drive pin engaging a drive pin cutout extending radially outward from the non-circular opening.

15. A quick disconnect pin assembly comprising:
a pin member having a nose assembly at a first end of the pin member;
a locking member is movably mounted in the nose assembly to lock and unlock the pin member;
a core shaft member extends through the pin member for moving the locking member;
a handle assembly is operatively connected to a second end of the pin member including a handle member and a plunger member mounted to the handle member for relative movement wherein the plunger member is released from engagement with the handle member when moved in a first direction and is held to the handle member when moved in a second direction wherein the core shaft member is in a first latch position when the phage member is biased to the handle member by a first spring member; and
an actuator sleeve member mounted for relative movement with the pin member wherein the actuator sleeve member is held to the pin member when moved in a first direction and is released from engagement with the pin member when moved in a second direction wherein the core shaft member is also in a second latch position when the activator sleeve member is biased to the pin member by a second spring member, wherein the first latch position and the second latch position are released when the plunger member and the actuator sleeve member are pulled towards each other against the bias of the respective first spring member and second spring member to enable actuation by rotation of the locking member for either locking or unlocking of the pin member.

16. A quick disconnect pin assembly comprising:
an elongated pin member having a nose assembly at a first end of the pin member;
a locking member is rotably mounted about an off-center position in the nose assembly from a center axis of the pin member;
a core shaft member extending through the elongated pin member for rotating the locking member;
a plunger member operatively connected to the core shaft member;
a handle assembly operatively connected to a second end of the pin member including a handle member, the plunger member is mounted in the handle member for relative movement wherein the plunger member is released from engagement with the handle member when moved in a first direction and is held to the handle member when moved in a second direction wherein the core shaft member is in a non-rotatable state when the plunger member is held to the handle member; and
an actuator sleeve member mounted for relative movement with the pin member wherein the actuator sleeve member is held to the pin member when moved in a first direction and is released from engagement with the pin member when moved in a second direction wherein the core shaft member is also in a non-rotatable state when the activator sleeve member is held to the pin member, wherein both the plunger member and the actuator sleeve member must be moved to released positions to enable rotation by the user of the locking member.

* * * * *